UNITED STATES PATENT OFFICE.

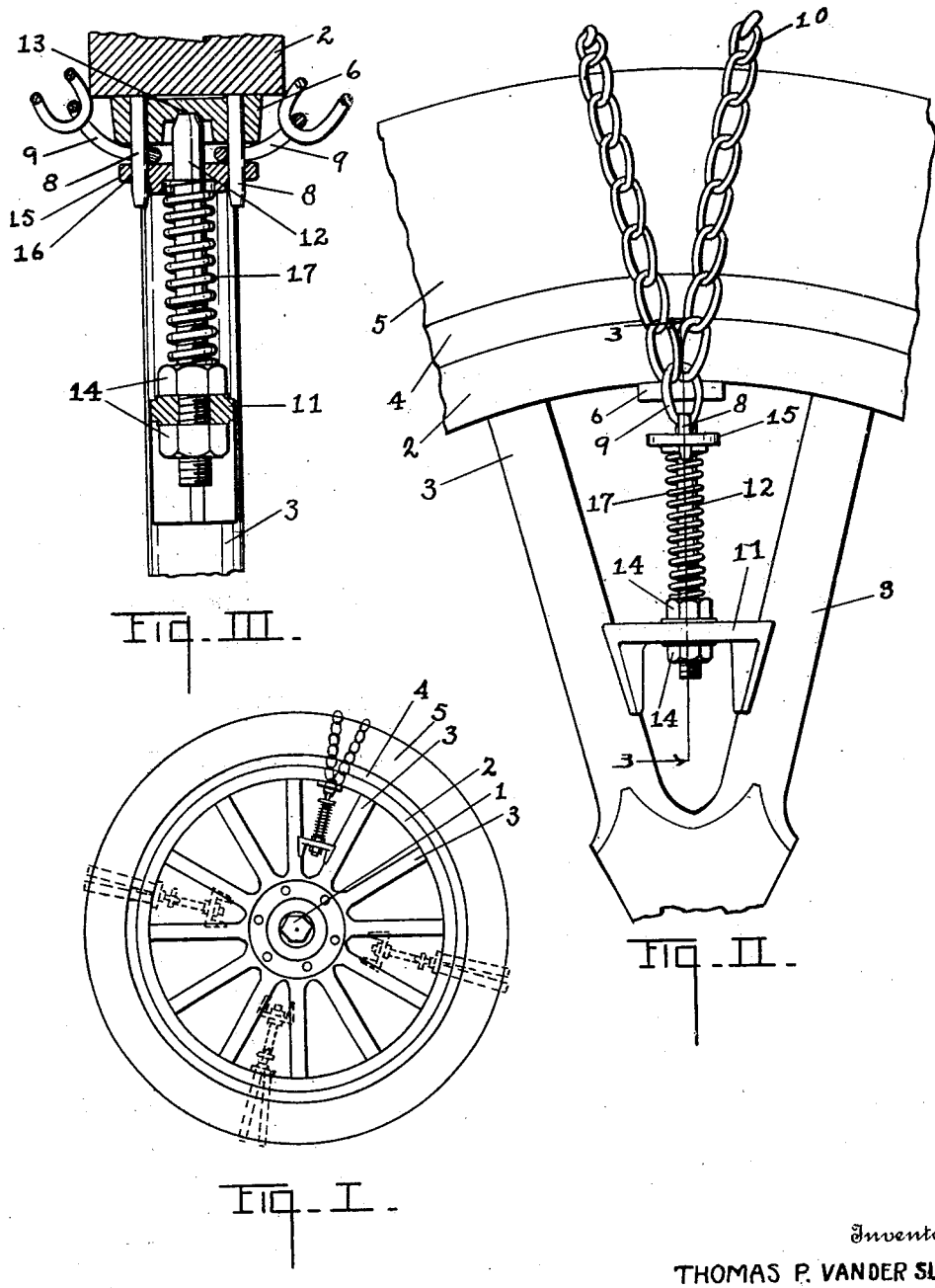

THOMAS P. VANDER SLIK, OF KALAMAZOO, MICHIGAN, ASSIGNOR OF ONE-HALF TO JOHN BAKER, OF KALAMAZOO, MICHIGAN.

ANTISLIP DEVICE.

1,370,245. Specification of Letters Patent. Patented Mar. 1, 1921.

Application filed March 13, 1920. Serial No. 365,491.

*To all whom it may concern:*

Be it known that I, THOMAS P. VANDER SLIK, a citizen of the United States, residing at the city and county of Kalamazoo, State of Michigan, have invented certain new and useful Improvements in Antislip Devices, of which the following is a specification.

This invention relates to improvements in anti-slip devices for vehicle wheels.

The main object of this invention is to provide an improved anti-slip device which may be applied to motor vehicle wheels of different sizes and the tread chains or tread members may be quickly removed and replaced as occasion requires.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of a wheel having my improved anti-slip devices applied thereto, four of the devices being indicated.

Fig. II is an enlarged detail side elevation.

Fig. III is a detail section on a line corresponding to line 3—3 of Fig. II.

In the drawing similar reference characters refer to similar parts throughout the several views, and the sectional views are taken looking in the direction of the little arrows at the ends of the section lines.

Referring to the drawing, 1 represents the hub, 2 the felly, 3 the spokes, 4 the rim and 5 the tire of a motor vehicle wheel of well-known construction.

My improved anti-slip device comprises a felly plate 6 adapted to seat on the inside of the felly, the felly plate being provided with studs 8 with which links, as 9, of the tread chain 10 may be engaged. The tread chain is preferably a continuous or endless chain so that any of the links may be engaged with the studs thus changing the point of wear on the chain.

I provide a tapered spoke clamp member 11 adapted to fit between a pair of adjacent spokes 3. The clamping rod 12 engages a seat 13 provided therefor in the felly plate and is arranged through the clamp member 11. The clamping rod is threaded and provided with nuts 14, there being a nut disposed on either side of the member 11 so that by adjusting the nuts the clamping pressure is applied to clamp the plate 6 to the felly.

The studs are preferably provided with a guard plate 15 slidably mounted on the clamping rod and having holes 16 therein to receive the studs. The plate not only forms a guard for the studs but also a support member for the outer ends thereof.

A coiled spring 17 arranged on the rod yieldingly holds the guard plate in its guard position. When it is desired to release the tread chain the guard plate is pushed up on the rod until the links may be lifted off the ends of the studs.

My improved anti-slip device may be applied to wheels of varying sizes and without injury thereto or the necessity of providing bolts or screws. The tread chains or members are securely retained but at the same time may be quickly attached and detached, as occasion requires.

Having thus described my invention, what I claim as new and desire to secure by Letters Patent, is:

1. In a structure of the class described, the combination of a felly plate seating on the inside of a felly and provided with inwardly projecting tread member engaging studs, a tapered spoke clamp member engaging between a pair of adjacent spokes, a threaded rod seated on said felly plate and disposed through said clamp member, clamping nuts on said rod disposed on opposite sides of said clamp member, a guard plate slidably mounted on said rod and having holes to receive said studs, and a spring arranged on said rod to act on said guard plate.

2. In a structure of the class described, the combination of a felly plate seating on the inside of a felly and provided with inwardly projecting tread member engaging studs, a tapered spoke clamp member engaging between a pair of adjacent spokes, a threaded rod seated on said felly plate and disposed through said clamp member and clamping nuts on said rod disposed on opposite sides of said clamp member.

3. In a structure of the class described, the combination of a felly plate seating on the inside of a felly and provided with a tread member engaging stud, a spoke clamp member engaging between a pair of adjacent spokes, a clamping rod engaging said felly plate and adjustably associated with said clamp member, a guard slidably mounted on said rod to coact with said stud, and a spring arranged on said rod to act on said guard.

4. In a structure of the class described, the combination of a felly plate seating on the inside of a felly and provided with a tread member engaging stud, a spoke clamp member engaging between a pair of adjacent spokes, a clamping rod engaging said felly plate and adjustably associated with said clamp member, and a guard adjustably mounted on said rod to coact with said stud.

In witness whereof, I have hereunto set my hand and seal in the presence of two witnesses.

THOMAS P. VANDER SLIK. [L. S.]

Witnesses:
MARGARET L. GLASGOW,
LORENA G. SUMMERS.